United States Patent [19]

Iwano

[11] Patent Number: 4,958,665
[45] Date of Patent: Sep. 25, 1990

[54] APPARATUS FOR ADJUSTING LEVEL OF LIQUID TO BE FILLED INTO PACKAGING TUBE

[75] Inventor: Fumiyuki Iwano, Tokushima, Japan

[73] Assignee: Shikoku Kakoki Co., Ltd., Itano, Japan

[21] Appl. No.: 271,789

[22] Filed: Nov. 16, 1988

[30] Foreign Application Priority Data

Nov. 20, 1987 [JP] Japan ............................. 62-177705[U]

[51] Int. Cl.$^5$ .............................................. B65B 3/30
[52] U.S. Cl. ..................................... 141/95; 141/128; 141/DIG. 1; 141/212; 141/219; 141/220; 141/114; 53/503; 53/504; 53/551; 73/DIG. 5
[58] Field of Search .................... 141/95, 128, DIG. 1, 141/114, 192, 193, 194, 198, 216, 212; 137/409, 412, 432; 53/503, 504, 551; 73/308, 313, DIG. 5

[56] References Cited

U.S. PATENT DOCUMENTS

| 2,687,740 | 8/1954 | Järund | 53/503 |
| 3,164,936 | 1/1965 | Löliger | 53/551 |
| 3,282,020 | 11/1966 | Smith | 141/95 |
| 3,966,437 | 6/1976 | De Wolf et al. | 137/412 |
| 4,211,263 | 7/1980 | Kennedy et al. | 141/128 |
| 4,446,674 | 5/1984 | Inada | 141/128 |
| 4,660,586 | 4/1987 | Knapp et al. | 137/386 |
| 4,715,398 | 12/1987 | Shouldice et al. | 137/386 |
| 4,744,808 | 5/1988 | Treu | 137/412 |
| 4,809,485 | 3/1989 | Nielsen | 53/551 |

FOREIGN PATENT DOCUMENTS

| 1473030 | 8/1969 | Fed. Rep. of Germany | 73/313 |
| 2524173 | 3/1982 | France | 141/95 |
| 56-35879 | 4/1981 | Japan | 137/432 |
| 7807169 | 6/1978 | Netherlands | 137/412 |
| 2046523 | 11/1980 | United Kingdom | 137/412 |

Primary Examiner—Henry J. Recla
Assistant Examiner—Edward C. Donovan
Attorney, Agent, or Firm—Armstrong, Nikaido, Marmelstein, Kubovcik & Murray

[57] ABSTRACT

An apparatus for adjusting the level of a liquid filling a packaging tube comprises a float for use as suspended in the liquid filling the tube, a magnet attached to the float, and a magnetic sensor for detecting from outside the tube variations in the intensity of magnetism due to the upward or downward movement of the magnet to produce an output signal. The level of the liquid in the tube is adjusted in accordance with the output signal of the sensor.

5 Claims, 1 Drawing Sheet

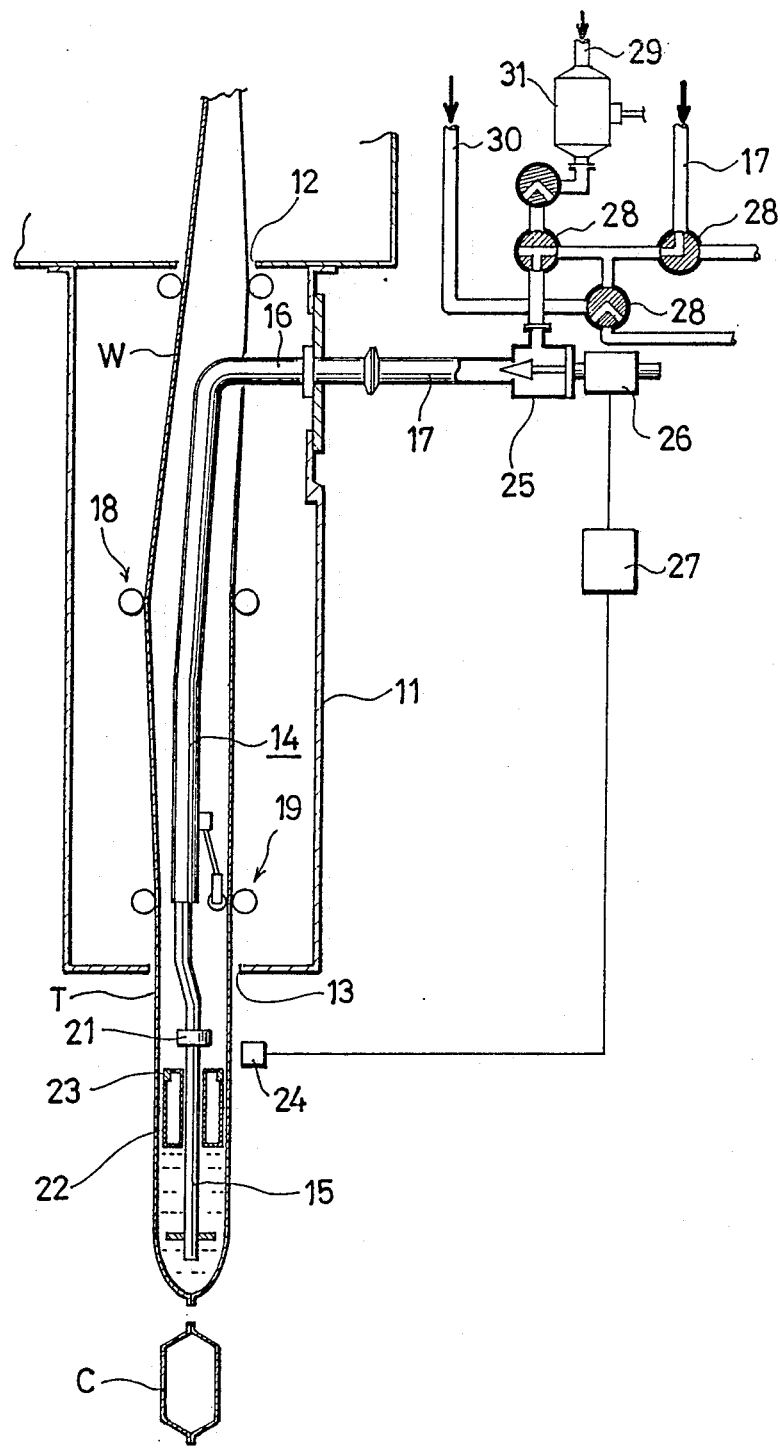

APPARATUS FOR ADJUSTING LEVEL OF LIQUID TO BE FILLED INTO PACKAGING TUBE

BACKGROUND OF THE INVENTION

The present invention relates to an apparatus for use in a packaging machine wherein a vertical tube filled with a fluid food or like contents is divided into lengths each corresponding to one container to obtain intermediate containers, which are eventually made into rectangular parallelepipedal completed containers, the apparatus being adapted to adjust the level of the fluid or liquid to be filled into the tube to a predetermined level.

The conventional apparatus of the type mentioned above include one which comprises a vertical filling pipe covered with a packaging tube, a damper provided inside the filling pipe close to its lower end and pivotally movable upward or downward, an annular float fitted around the filling pipe upwardly or downwardly movably and positioned a small distance above the damper, and a connector connecting the movable end of the damper to the float. The upward or downward movement of the float opens or closes the level of a liquid filling the tube.

It is strongly required that recent machines for preparing aseptic products be antiseptic. To meet this requirement, the machine must be highly amenable to cleaning and sterilization, whereas the conventional apparatus described has the damper within the filling pipe and can not therefore be cleaned and sterilized efficiently. Especially, the pin supporting the damper for pivotal movement poses problems.

SUMMARY OF THE INVENTION

The main object of the present invention is to obviate the above drawback and provide an apparatus for adjusting the level of a liquid filling a packaging tube.

For use in a packaging machine adapted to cover a vertical portion of a filling pipe with a packaging tube, close the lower end of the tube at a position below the vertical portion and fill a liquid into the tube to a predetermined level from a lower end opening of the vertical portion, the present invention provides an apparatus for adjusting the level of the liquid to be filled in the packaging tube, comprising a flow control valve for controlling the flow of the liquid to be supplied to the filling pipe, a float for use as suspended in the liquid filled in the tube, a magnet attached to the float, a magnetic sensor for detecting from outside the tube variations in the intensity of magnetism due to the upward or downward movement of the magnet to produce an output signal, and a control unit for controlling the opening of the flow control valve in accordance with the output signal of the magnetic sensor.

According to the present invention, the magnet attached to the float disposed inside the tube is detected by the magnetic sensor from outside the tube, and the flow of liquid to be supplied to the filling tube is adjusted by the flow control valve which is controlled in accordance with the output signal from the sensor. Since there is no need to provide any member within the filling pipe for controlling the valve, the apparatus is very efficient to clean and sterilize.

BRIEF DESCRIPTION OF THE DRAWING

The drawing is a diagram showing the construction of an embodiment of the invention.

DESCRIPTION OF THE PREFERRED EMBODIMENT

An embodiment of the invention will be described below in detail with reference to the drawing.

An aseptic chamber 11 in the form of a vertically elongated rectangular parallelepiped has upper and lower openings 12 and 13 formed in its top wall and bottom wall, respectively. A filling pipe 14 extends through the aseptic chamber 11. The pipe 14 is inverted L-shaped and comprises a vertical portion 15 and a horizontal portion 16. The vertical portion 15 has a lower part projecting downward from the chamber 11 through the lower opening 13. The horizontal portion 16 extends through a side wall of the chamber 11 outward therefrom and has a liquid supply pipe 17 connected to its outer end. Although not shown in detail, upper and lower groups of squeeze rollers 18, 19 are arranged around the vertical portion 15 within the aseptic chamber 11. A web of packaging material, W, is fed into the aseptic chamber 11 through the upper opening 12 and shaped into a tube T by being caused to cover the vertical portion 15 by the rollers 18, 19. The tube T is led out of the chamber 11 through the lower opening 13. The vertical portion 15 has a lower end opening, under which an unillustrated container shaping apparatus is provided for dividing the tube T into lengths each corresponding to one container to obtain intermediate containers C and for closing the lower end of the tube T.

The vertical portion 15 has an annular stopper 21 on the part thereof projecting downward from the aseptic chamber 11. A hollow cylindrical float 22 is disposed below the stopper 21. The stopper 21 is positioned at such a level that when the level of a liquid filling the tube T is a predetermined level, the float 22 suspended in the liquid is in contact with the stopper 21. The float 22 is fitted around the vertical portion 15 within the tube T and is free to move upward or downward. An annular magnet 23 is attached to the upper surface of the float 22 at its upper end. A magnetic sensor 24 is disposed outside the tube T at a position slightly below the stopper 21. The sensor 24 converts variations in the intensity of the magnetism to produce an electric signal. More specifically, the sensor 24 produces a high level signal when the spacing between the stopper 21 and the float is less than a predetermined distance or a low level signal when the spacing is not smaller than the predetermined distance. On the other hand, the liquid supply pipe 17 is provided with a flow control valve 25 operated by a solenoid 26, which in turn is controlled by a control unit 27. The output signal of the magnetic sensor 24 is fed to the control unit 27. One of the liquid supply pipe 17, a hot air pipe 29 and a steam pipe 30 is selectively connected to the inlet of the flow control valve 25 by three-way valve 28. The hot air pipe 29 is provided with a chamber 31 for spraying an aqueous solution of hydrogen peroxide.

The flow control valve 25 is set to two flow rates: an excessive rate exceeding a standard amount to be filled per unit time by a unit amount, and a deficient rate less than the standard amount by the unit amount. The control unit 27 controls the opening of the valve 25 to the deficient rate when the magnetic sensor 24 produces the high level signal or to the excessive rate when the sensor 24 produces the low level signal.

Although the above embodiment is so adapted that the magnetic sensor produces two signals, i.e., the high level signal and the low level signal, permitting the flow control valve to control the flow to two rates, i.e., high and low, the flow rate may alternatively be controlled steplessly. In this case, a solenoid operated proportional valve is used as the flow control valve, and the magnetic sensor is adapted to produce a signal gradually lowering from a high level to a low level in proportion to an increase in the distance between the stopper and the float, so that the opening of the flow control valve is controlled to give a flow rate which gradually increases as the output signal level lowers.

Furthermore, upper and lower magnetic sensors may be arranged at different positions to adjust the liquid level in accordance with the output signals of these sensors.

What is claimed is:

1. In a packaging machine having a vertical portion of a filing pipe adapted to be enclosed by a packaging tube formed from a web of packaging material, and fill a liquid into the tube to a predetermined level from a lower end opening of the vertical portion, an apparatus for adjusting the level of the liquid to be filled into the packaging tube, comprising:
   a flow control valve for controlling the flow of the liquid to be supplied to the filling pipe,
   a float slidably suspended by the filling pipe into the liquid filled in the tube,
   a magnet attached to the float,
   a magnetic sensor for detecting from outside the tube variations in the intensity of magnetism due to the upward or downward movement of the magnet to produce an output signal, and
   a control unit for controlling the setting of the flow control valve in accordance with the output signal of the magnetic sensor.

2. An apparatus as defined in claim 1, wherein the filling pipe is provided with a stopper for restraining the float from moving upward, the stopper being positioned at a level permitting the float to be in contact with the stopper when the level of the liquid filling the tube is the predetermined level, the magnetic sensor being operable to produce a high level signal when the spacing between the stopper and the float is less than a predetermined distance or a low level signal when the spacing is not smaller than the predetermined distance, the flow control valve having two flow rate settings, one of the settings being an excessive rate exceeding a predetermined amount to be filled per unit time by a unit amount, the other setting being a deficient rate less than the predetermined amount by the unit amount, the control unit being operable to control the setting of the flow control valve to the deficient rate when the magnetic sensor produces the high level signal or to control the valve setting to the excessive rate when the magnetic sensor produces the low level signal.

3. An apparatus as defined in claim 1, wherein the filling pipe is provided with a stopper for restraining the float from moving upward, the stopper being positioned at a level permitting the float to be in contact with the stopper when the level of the liquid filling the tube is the predetermined level, the magnetic sensor being operable to produce a signal gradually lowering from a high level to a low level in proportion to an increase in the distance between the stopper and the float, the flow control valve being a solenoid operated proportional valve, the control unit being operable to control the setting of the flow control valve to a flow rate gradually increasing as the level of the output signal of the magnetic sensor lowers.

4. An apparatus as defined in claim 1, wherein the float is a comparatively long hollow cylinder having a closed cylindrical hollow chamber therein and having a comparatively long through hole having an inner diameter slightly smaller than an outer diameter of the filling pipe.

5. An apparatus as defined in claim 4, wherein the magnet is a small magnet ring attached at an uppermost outer shoulder of the float.

* * * * *